United States Patent
Bhat et al.

(10) Patent No.: US 11,989,119 B2
(45) Date of Patent: *May 21, 2024

(54) TEST CASE OPTIMIZATION AND PRIORITIZATION

(71) Applicant: Accenture Global Solutions Limited, Dublin (IE)

(72) Inventors: Sandeep Bhat, Pleasanton, CA (US); Rohit Shrikant Patwardhan, Maharashtra (IN); Rahul Ghanashyam Joglekar, Pune (IN)

(73) Assignee: Accenture Global Solutions Limited, Dublin (IE)

( * ) Notice: Subject to any disclaimer, the term of this patent is extended or adjusted under 35 U.S.C. 154(b) by 138 days.

This patent is subject to a terminal disclaimer.

(21) Appl. No.: 17/679,406

(22) Filed: Feb. 24, 2022

(65) Prior Publication Data

US 2022/0179777 A1    Jun. 9, 2022

Related U.S. Application Data

(63) Continuation of application No. 16/862,831, filed on Apr. 30, 2020, now Pat. No. 11,288,172.

(30) Foreign Application Priority Data

Mar. 30, 2020   (IN) .............................. 202011014116

(51) Int. Cl.
*G06F 9/44* (2018.01)
*G06F 11/36* (2006.01)
(Continued)

(52) U.S. Cl.
CPC ...... *G06F 11/3684* (2013.01); *G06F 11/3688* (2013.01); *G06F 11/3692* (2013.01);
(Continued)

(58) Field of Classification Search
CPC ............ G06F 11/3684; G06F 11/3688; G06F 11/3692; G06F 40/42; G06N 20/20; G06K 9/6256

See application file for complete search history.

(56) References Cited

U.S. PATENT DOCUMENTS 10,592,398 B1 * 3/2020 Dwarakanath ...... G06F 11/3688
11,288,172 B2   3/2022 Bhat et al.
(Continued)

FOREIGN PATENT DOCUMENTS

CN    109976990    7/2019

OTHER PUBLICATIONS

Lachmann ("Machine Learning-Driven Test Case Prioritization Approaches for Black-Box Software Testing," 2018) (Year: 2018).*

(Continued)

*Primary Examiner* — Chat C Do
*Assistant Examiner* — Lenin Paulino
(74) *Attorney, Agent, or Firm* — Fish & Richardson P.C.

(57) ABSTRACT

Methods, systems, and apparatuses, including computer programs encoded on computer-storage media, for prioritizing test cases. Processes may include obtaining test artifacts that were generated based on testing one or more legacy versions of a software application using multiple test cases, generating a risk index based at least on the test artifacts that were generated based on testing the one or more legacy versions of the software application using the multiple test cases, and training an ensemble model that is configured to identify likely unnecessary or redundant test cases in connection with in testing an updated version of the software application, based at least on the risk index.

20 Claims, 3 Drawing Sheets

(51) Int. Cl.
    *G06F 18/214*     (2023.01)
    *G06F 40/42*     (2020.01)
    *G06N 20/20*     (2019.01)

(52) U.S. Cl.
    CPC ............ *G06F 18/214* (2023.01); *G06F 40/42* (2020.01); *G06N 20/20* (2019.01)

(56) References Cited

U.S. PATENT DOCUMENTS

| | | | | |
|---|---|---|---|---|
| 2015/0067648 | A1* | 3/2015 | Sivanesan | G06F 11/3684 717/124 |
| 2017/0046245 | A1* | 2/2017 | Liu | G06F 11/368 |
| 2020/0097388 | A1* | 3/2020 | Bhat | G06F 11/3608 |
| 2020/0272559 | A1* | 8/2020 | Ahluwalia | G06N 20/00 |
| 2021/0303450 | A1 | 9/2021 | Bhat et al. | |

OTHER PUBLICATIONS

Anderson et al. ("On The Use of Neural Networks to Guide Software Testing Activities," 1995) (Year: 1995).*

Lachman et al. ("System-Level Test Case Prioritization Using Machine Learning," 2016) (Year: 2016).*

Anderson et al., "On the Use of Neural Networks to Guide Software Testing Activities," Proceedings of the IEEE International Test Conference, Washington, DC, USA, Oct. 21-25, 1995, 720-729.

Eghbali et al., "Supervised Tie Breaking in Test Case Prioritization," Proceedings of the IEEE/ACM 41st International Conference on Software Engineering: Companion Proceedings (ICSE-Companion), Montreal, Quebec, CA, May 25-31, 2019, 242-243.

EP Extended Search Report in European Appln. No. 21155086.8, dated Aug. 13, 2021, 11 pages.

IN Office Action in Indian Appln. No. 202011014116, dated Nov. 3, 2021, 8 pages.

Lachmann et al., "System-Level Test Case Prioritization Using Machine Learning," Proceedings of the 15th IEEE International Conference on Machine Learning and Applications (ICMLA), Anaheim, CA, USA, Dec. 18-20, 2016, 361-368.

Lachmann, "Machine Learning-Driven Test Case Prioritization Approaches for Black-Box Software Testing," Proceedings of the European Test and Telemetry Conference, Nuremberg, Germany, Jun. 26-28, 2018, 300-309.

* cited by examiner

TEST CASE OPTIMIZATION AND PRIORITIZATION

CROSS-REFERENCE TO RELATED APPLICATION

This application is a continuation of U.S. application Ser. No. 16/862,831, filed Apr. 30, 2020, which claims the benefit of Indian Provisional Patent Application No. 202011014116, filed Mar. 30, 2020, the entirety of which is hereby incorporated by reference.

FIELD

This specification generally relates to software application test automation.

SUMMARY

Software applications are designed to accommodate a multitude of transactions across different functional areas, where each transaction often requires the performance of a significant number of functions. Testing of software applications may include creating test cases based on requirements and then executing the test cases through, for example, a test script to detect defects.

Test cases may be automated using commercial and open source tools to reduce execution time. Once automated, these test cases can be executed repeatedly and frequently, which adds to the amount of testing coverage for the respective application. However, effective and efficient management of such suites of test cases is both time consuming and effort intensive.

The selection and prioritization of test cases for execution is generally performed under conditions of high uncertainty, including uncertainty regarding final application requirements, uncertainty regarding which functional areas need to be prioritized, scheduling uncertainty, and uncertainty regarding a determination of whether certain software behaviors are normal or anomalous. Given these uncertainties, it is not uncommon for redundant or unwanted test cases to be run, potentially increasing product backlog when the detection of defects is delayed.

Examples of redundant test cases include test cases that only identify anomalous software behaviors that are always detected by other test cases. Examples of unwanted or unnecessary test cases include test cases that never identify any defects. Executing unwanted or redundant test cases can cause delays that can contribute to low productivity, diminishing the return on investment (ROI) for automated test scripting tools.

SUMMARY

Implementations of the present specification are generally directed to prioritizing test cases for execution on an updated version of a software application based on features derived from test artifacts that resulted from executing the test cases on a legacy version of the software application. In one example, one feature that is used to prioritized test cases is a risk index, which is derived via a weighted aggregation of certain parameter values of features such as a count of test cases, a count of defects, and other features. Prioritization of test cases can reduce delays and free up computer resources associated with the execution of unnecessary or redundant test cases.

One general implementation includes the actions of obtaining test artifacts that were generated based on testing one or more legacy versions of a software application using multiple test cases, generating a risk index based at least on the test artifacts that were generated based on testing the one or more legacy versions of the software application using the multiple test cases, and training an ensemble model that is configured to identify likely unnecessary or redundant test cases in connection with in testing an updated version of the software application, based at least on the risk index. The actions also include generating, using the ensemble model, a score for each of the multiple test cases in connection with testing the updated version of the software application, and outputting data identifying one or more of the multiple test cases and, for each test case, the score in connection with testing the updated version of the software application.

Implementations may include one or more of the following features. The risk index may be generated for each functional area or module of the software application. Obtaining the test artifacts may include generating the test artifacts based on a test case execution history of executing the multiple test cases on the one or more legacy versions of the software application. The test artifacts may include data indicating a number of times each test case was executed, data indicating a priority that was assigned to each test case, data indicating a number of times that each test case passed, data indicating a number of times that each test case failed, data indicating an execution status of each test case a first time that the test case was executed, and/or data indicating a sequence number associated with each test case that failed.

Additionally, generating the risk index based at least on the test artifacts that were generated based on testing the one or more legacy versions of the software application using the multiple test cases may include aggregating, for a particular functional area or module of the software application, a count of test cases that are associated with the particular functional area or module of the software application, a count of defects that are associated with the particular functional area or module of the software application, a value that represents a ratio of the count of test cases that are associated with the particular functional area or module of the software application to the count of defects that are associated with the particular functional area or module of the software application, and/or a count of defects that are associated with the particular functional area or module of the software application and that are indicated as high priority. The actions may include training, using the test artifacts, a natural language processing model to predict, for a given textual description associated with a given test case, whether the given test case is likely to pass or fail, where the ensemble model is trained further based on predictions that are generated for the multiple test cases using the natural language processing model.

Furthermore, the natural language processing model may be trained using pre-processed versions of original textual descriptions associated with test cases, where the pre-processing the original textual descriptions may include applying lowercase conversions, removing numbers, removing punctuation, removing stop words, removing extra whitespace, and applying word stemming or lemmatization. The ensemble model may be trained further based directly on a subset of the test artifacts. The subset of the test artifacts that are used directly to train the ensemble model may include data indicating a number of times each test case was executed, data indicating a number of times each test case passed, data indicating a number of times each test case filed, data indicating an execution status of each test case when the test case was first executed, and data indicating a sequence number associated with each test case that failed.

Moreover, the ensemble model may be trained further based on tunable parameters that define desired model metrics and a resource budget. Outputting data identifying one or more of the multiple test cases and, for each test case, the score in connection with testing the updated version of the software application may include generating and providing, for output, a ranked list of test cases on a user interface. The actions may include executing the multiple test cases on the second version of the software application in a prioritized order according to the score.

Other implementations of any of the above aspects include corresponding systems, apparatus, and/or computer programs that are configured to perform the operations of the methods. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more computers, and one or more computer memory devices coupled to the one or more computers having instructions stored thereon which, when executed by the one or more computers, cause the one or more computers to perform operations in accordance with implementations of the methods provided herein.

These implementations may provide for several important technical advantages. For instance, by prioritizing test cases, test cases that are most likely to identify an important anomaly are identified for execution sooner than test cases that are unlikely to identify important anomalies, that are likely to not identify any anomalies at all, or that are likely to only identify anomalies that other test cases are also likely to identify. Computational resources are saved by not executing unwanted or redundant or unnecessary test cases. The early detection of defects reduces uncertainties that can lead to product backlog. Prioritization of test cases on updated versions of software applications can be performed using information that is already generated in the testing of legacy versions of the same software application, or of different software applications, eliminating additional or stand-alone feature generation operations.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
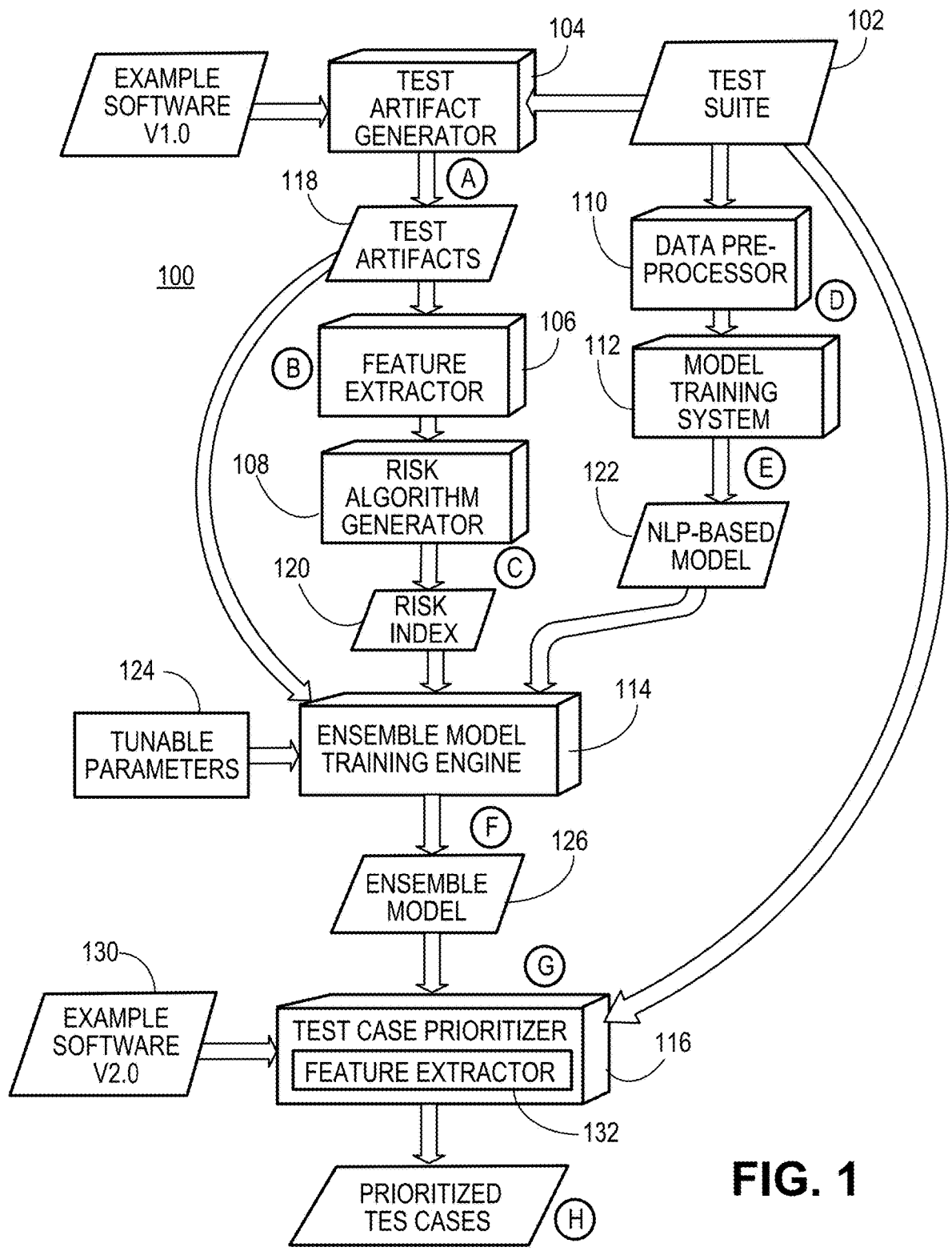
FIG. 1 illustrates an architecture for prioritizing test cases using ensemble learning.

FIG. 1 illustrates an enhanced architecture 100 for prioritizing test cases of a test suite 102 using ensemble learning. At a high level, the enhanced architecture 100 uses multiple models, working together, to improve the selection, optimization, and/or prioritization of test cases that are to be executed on an updated version of a software application based on features derived from test artifacts that resulted from executing test cases on a legacy version of the software application. In one example, one feature that is used to prioritized test cases is a risk index, which is derived via a weighted aggregation of certain parameter values of features such as a count of test cases, a count of defects, and other features.

In more detail, the enhanced architecture 100 includes several components that are used to generate features and models that are used to prioritize test cases of the test suite 102, such as a test artifact generator that 104 is configured to generate test artifacts based on evaluating software using test cases, a feature extractor 106 that is configured to select, identify, or derive features from the test artifacts that are generated by the test artifact generator 104, and a risk algorithm generator 108 that is configured to consume the features that were extracted from the test artifacts, and to generate risk indices for test cases.

The enhanced architecture 100 also includes a data preprocessor 110 for consuming test case descriptions and outputting pre-processed text, and a model training system 112 that, based on the pre-processed text and class labels, is configured to generate natural language processing models that can predict test case outcomes based on natural language text included in test case descriptions that are associated with test cases by developers.

The enhanced architecture 100 also includes an ensemble model training engine 114 that, based on various features that are generated by other components of the enhanced architecture 100, is configured to generate ensemble models that can be used by a test case prioritizer 116 to generate prioritized lists of test cases of the test suite 102 (or of other test cases). Notably, training of the ensemble models can be performed using information, e.g., test artifacts 118, that was already generated in the testing of legacy versions of the same software application, or of different software applications, eliminating additional or stand-alone feature generation operations.

The operation of the enhanced architecture 100 is described below in connection with illustrated stages (A) through (H), below. In stage (A), the test suite 102, which may include a single test case, dozens of test cases, hundreds or thousands (or even more) of test cases, is executed on one or more legacy versions of a software application (in the Figure, "Example Software v1.0"), and test artifacts 118 are generated.

Test artifacts 118, which are generated as a result of executing the test suite 102 on the legacy versions of the software application, include status information that reflects various metrics regarding the performance of each test case while testing the software application. Some of these metrics reflect information about the success or failure of the test case when an attempt was made to test functionality of the software application, such as whether the test case successfully executed to completion, the number of times that the test case was attempted or the number of times that execution of the test case was deemed successful or failed, and/or status information, such as a sequence number, associated with the test case when execution of the test case was attempted or was deemed successful or failed.

Features, such as parameter values, are extracted from the test artifacts 118 during stage (B), and, during stage (C), the risk algorithm generator 108 uses certain of the extracted features to generate a value for a risk index 120. A custom reinforced type algorithm may be used to calculate a score for a risk index for each of the functional areas of the software applications, or for each module of the software application that is under test. The score for the risk index can be bounded to a particular range, e.g., from 1 to 10, where 10 represents a highest risk.

Using features such as a requirement count, a test case count, an average requirement complexity, a defects count, a test cases to defects ratio, a requirements to defects ratio, a high requirement complexity average to high severity defects ratio, a high requirement complexity average to low severity defects ratio, Equation (1) can ingest values for each feature, and can be used to generate a weighted average for each parameter:

$$\bar{x} = \frac{\sum_{i=1}^{n} w_i x_i}{\sum_{i=1}^{n} \omega_i} \quad (1)$$

Because the calculation of a risk index is a reinforced type algorithm, additional learning occurs as additional information is received, i.e., as the suite of test cases is executed on additional, interim versions of the software application.

Feature values can be weighted when combined to generate the value for the risk index. For instance, in one example calculation, a count of test cases can make up 10% of the value of the risk index, a count of defects can make up 10% of the value of the risk index, a test case to defects ratio can make up 20% of the value of the risk index, a count of high priority defects can make up 10% of the value of the risk index, a high requirements complexity average to high defect severity ratio can make up 25% of the value of the risk index, a high requirement complexity average to low defect severity ratio can make up 5% of the value of the risk index, and a low requirement complexity average to low defect severity ratio can make up 20% of the value of the risk index. Other weightings or other feature values can be used in other risk index calculation algorithms.

In addition to generating the risk index 120, the enhanced architecture 100 may optionally generate an NLP-based model 122 by pre-processing test case description data that is associated with the test cases of the test suite 102 (at stage (D)), and by training the NLP-based model 122 (at stage (E)) using the pre-processed, test case description data.

The NLP-based model 122 can be trained using textual test case descriptions and pass-or-fail class labels, where the test case descriptions may optionally be pre-processed or otherwise standardized prior to model training. Test case descriptions are typically generated by test case developers to describe the object of each test case. Pre-processing the test case descriptions may include processes to convert test case descriptions to lower case, to remove numbers, punctuation, stop words or extra whitespace, or to apply word stemming or lemmatization.

Once trained the NLP-based model can provide an NLP-based prediction of a pass-or-fail outcome for an input test case description, which can be used as an optional, independent feature for an ensemble model. Training may occur using a random forest technique or other similar technique.

In other implementations, the NLP-based model 122 may be a machine learning model that includes one or more neural network layers. The machine learning model can include a convolutional neural network (CNN) embedding model. The CNN embedding model can include one or more LSTM layers and may be a deep LSTM neural network architecture built by stacking multiple LSTM layers. The CNN embedding model may be trained using a loss function tuned for learning differentiation features. The different features can include triplet loss function, softmax loss function, or n-pairs loss function, to name a few examples.

Using the risk index 120 and, optionally, tunable parameters 124, feature values extracted from the test artifacts, and/or predictions that are output by the NLP-based model 122, the ensemble model training engine 114 can generate an ensemble model 126, at stage (F). The ensemble model 126 may use, as a feature set, a count of the number of times a test case has been executed, a count of a number of times the test case has passed, a number of times that the test case has failed, a status of the test case upon first execution, a sequence number for the test case when the test case failed, the value of the risk index, and an outcome prediction for the test case using the NLP-based model. Fewer or more features may be used.

Tunable parameters 124 that may be used to configure the ensemble model 126 may specify, for instance, a desired model metric, such as a desired F1 score or accuracy for the trained ensemble model 126, may define a budget, such as a number of training iterations, or may specify a best fit mode, such as hyper-parameterization.

In one example of how tunable parameters may affect outcomes, a tunable parameter may specify a budget of 100 iterations. The ensemble model training engine 114 can then train 100 machine learning models given the provided features, using different algorithms. Once all of the 100 algorithms are trained, the model having the best performance, e.g., as defined by a different tunable parameter, is chosen as the ensemble model 126.

The test case prioritizer 116 can use the ensemble model 126 to generate prioritized test cases. Specifically, the test case prioritizer 116 can use a custom algorithm that considers, for each test case, the prediction of the ensemble model 126 for the test case, the risk index value for the test case, and the priority assigned to the test case, to generate a risk score that is used to assign test cases to a category of "low risk," "medium risk," and "high risk" for risk-based testing.

In one example, the custom algorithm weights the prediction of the ensemble model 126 as 30% of the risk score, the value of the risk index as 50% of the risk score, and a value reflecting the priority assigned to the case as 20% of the risk score. Other weightings can be used.

When, at stage (G), an updated version 130 of a software application (in the Figure, "Example Software v2.0") is to be tested, the test case prioritizer 116 is configured to extract features of the test cases of the test suite 102, using feature extractor 132. By applying these features to the ensemble model 126, the test case prioritizer 116 is configured to, at stage (H), prioritize the test cases of the test suite 102. By prioritizing test cases, the test case prioritizer 116 is able to those test cases that are most likely to identify important anomalies, and, by this same logic, is able to identify those test cases that are unlikely to identify unique anomalies at all.

Prioritizing test cases of the test suite may include executing the most important, or the non-trivial cases on the second version of the software application, in a prioritized order, e.g., according to an order specified by the ensemble model 126. By bypassing unwanted, unnecessary or redundant test cases, computational resources are preserved, and notable defects are detected at an earlier time.

Figure 2:
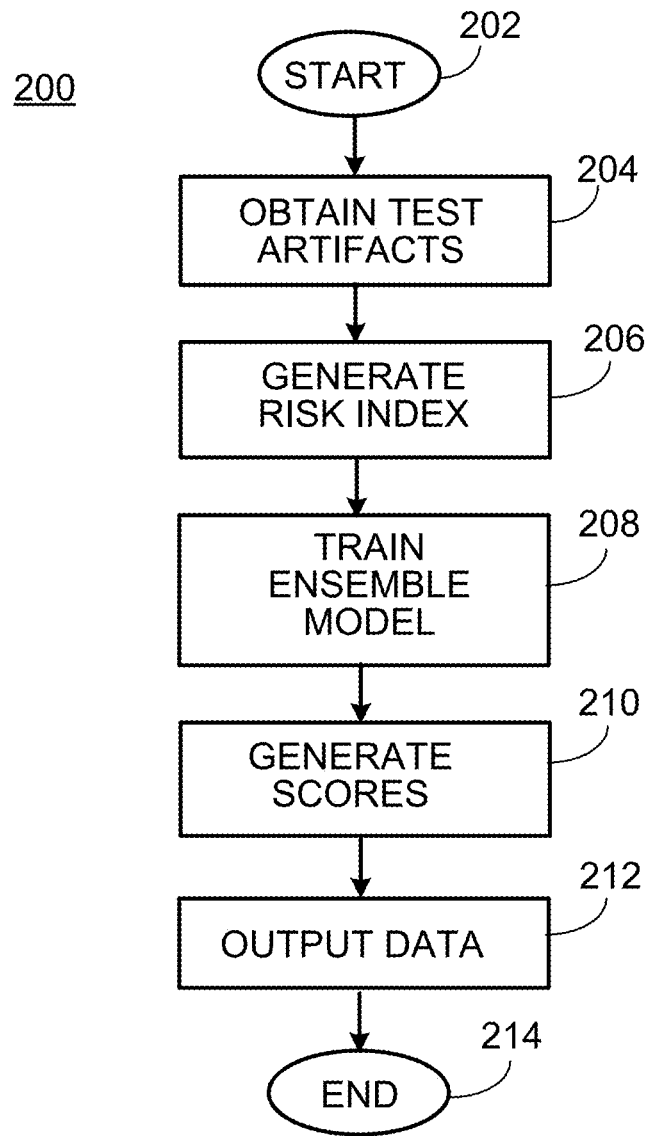
FIG. 2 is a flowchart that illustrates a process for prioritizing test cases using ensemble learning.

FIG. 2 is a flowchart that illustrates a process 200 for prioritizing test cases using ensemble learning. Briefly, the process 200 includes the actions of obtaining test artifacts that were generated based on testing one or more legacy versions of a software application using multiple test cases, generating a risk index based at least on the test artifacts that were generated based on testing the one or more legacy versions of the software application using the multiple test cases, and training an ensemble model that is configured to identify likely unnecessary or redundant test cases in connection with in testing an updated version of the software application, based at least on the risk index. The actions also include generating, using the ensemble model, a score for each of the multiple test cases in connection with testing the updated version of the software application, and outputting data identifying one or more of the multiple test cases and, for each test case, the score in connection with testing the updated version of the software application.

In more detail, when the process 200 begins (202), test artifacts that were generated based on testing one or more legacy versions of a software application using multiple test cases are obtained (204). Obtaining the test artifacts may include generating the test artifacts based on a test case execution history of executing the multiple test cases on the one or more legacy versions of the software application.

Test artifacts 118, which are generated as a result of executing the test suite 102 on the legacy versions of the software application, include status information that reflects various metrics regarding the performance of each test case while testing the software application. Some of these metrics reflect information about the success or failure of the test case when an attempt was made to test functionality of the software application, such as whether the test case successfully executed to completion, the number of times that the test case was attempted or the number of times that execution of the test case was deemed successful or failed, a status of the test case upon first execution, and/or status information, such as a sequence number, associated with the test case when execution of the test case was attempted or was deemed successful or failed.

Table 1, below, provides an example test execution history for an example suite of test cases. For each test case, for instance, the example test execution history includes a row of data indicating (i) a priority associated with each test case, (ii) a line of the test case that was executed, (iii) an execution status of the test case when the test case was first executed, (iv) a count of the number of times the test case was executed and passed, (v) a count of the number of times the test case was executed and failed, (vi) a risk index associated with the test case in the test execution history, (vii) a sequence number associated with the test case when the test case failed, and (viii) a class, e.g., 'passed' or 'failed' or 'indeterminate,' that was ultimately assigned to the test case. Fewer or more attributes can be included in the test execution history.

TABLE 1

Example Test Execution History

| TC_Priority | TC_Line_Executed | TC_First_Status | TC_Passed_Count | TC_Failed_Count | TC_Risk_Index | TC_Failed_Seq_No | class |
|---|---|---|---|---|---|---|---|
| 1-Critical | 1 | Passed | 1 | 0 | 6 | 0 | Passed |
| 2-High | 0 | Failed | 0 | 0 | 4 | 0 | Failed |
| 1-Critical | 5 | Passed | 5 | 0 | 3 | 0 | Passed |
| 1-Critical | 1 | Passed | 0 | 0 | 2 | 0 | Failed |
| 2-High | 2 | Passed | 2 | 0 | 1 | 0 | Failed |
| 3-Medium | 1 | Passed | 0 | 0 | 8 | 0 | Failed |
| 1-Critical | 1 | Passed | 1 | 0 | 3 | 0 | Failed |
| 1-Critical | 4 | Passed | 3 | 1 | 5 | 1 | Failed |
| 2-High | 4 | Passed | 1 | 3 | 9 | 2 | Failed |
| 1-Critical | 3 | Passed | 3 | 0 | 1 | 1 | Failed |
| 1-Critical | 4 | Passed | 2 | 2 | 8 | 1 | Failed |
| 2-High | 4 | Passed | 1 | 3 | 4 | 2 | Failed |
| 3-Medium | 3 | Passed | 2 | 1 | 9 | 1 | Failed |
| 3-Medium | 0 | Failed | 0 | 0 | 2 | 0 | Failed |
| 3-Medium | 4 | Passed | 2 | 2 | 2 | 2 | Failed |
| 4-Low | 2 | Passed | 1 | 1 | 3 | 1 | Passed |
| 3-Medium | 3 | Passed | 2 | 1 | 4 | 1 | Failed |
| 4-Low | 0 | Failed | 0 | 0 | 9 | 0 | Failed |

A custom reinforced type algorithm may be used to calculate a score for a risk index for each of the functional areas of the software applications, or for each module of the software application that is under test. The score for the risk index can be bounded to a particular range, e.g., from 1 to 100, where 100 represents a highest risk.

As noted above, using features such as a requirement count, a test case count, an average requirement complexity, a defects count, a test cases to defects ratio, a requirements to defects ratio, a high requirement complexity average to high severity defects ratio, a high requirement complexity average to low severity defects ratio, Equation (1) (above) can ingest values for each feature, and can be used to generate a weighted average for each parameter. Because the calculation of a risk index is a reinforced type algorithm, additional learning occurs as additional information is received, i.e., as the suite of test cases is executed on additional, interim versions of the software application.

Additionally, generating the risk index based at least on the test artifacts that were generated based on testing the one or more legacy versions of the software application using the multiple test cases may include aggregating, for a particular functional area or module of the software application, a count of test cases that are associated with the particular functional area or module of the software application, a count of defects that are associated with the particular functional area or module of the software application, a value that represents a ratio of the count of test cases that are associated with the particular functional area or module of the software application to the count of defects that are associated with the particular functional area or module of the software application, and/or a count of defects that are associated with the particular functional area or module of the software application and that are indicated as high priority.

An NLP-based model may optionally be trained using textual test case descriptions and pass-or-fail class labels, where the test case descriptions may optionally be pre-processed or otherwise standardized. Pre-processing the test case descriptions may include processes to convert test case descriptions to lower case, to remove numbers, punctuation, stop words or extra whitespace, or to apply word stemming or lemmatization.

Once trained the NLP-based model can provide an NLP-based prediction of a pass-or-fail outcome for an input test case description, which can be used as an optional, independent feature for an ensemble model. The NLP-based model looks at specific words in the test case description for new test cases, and can predict a pass-or-fail outcome for the new test cases based on historical results for other test cases.

An ensemble model that is configured to identify likely unnecessary or redundant test cases in connection with in testing an updated version of the software application is trained, based at least on the risk index (208). Ensemble model training can involve auto-algorithm selection, as well as hyper-parameterization selection.

In one example implementation, the ensemble model may use, as a feature set, a count of the number of times a test case has been executed, a count of a number of times the test case has passed, a number of times that the test case has failed, a status of the test case upon first execution, a sequence number for the test case when the test case failed, the value of the risk index, and an outcome prediction for the test case using the NLP-based model. Fewer or more features may be used.

In other implementations, the NLP-based model may be a machine learning model that includes one or more neural network layers. The machine learning model can include a convolutional neural network (CNN) embedding model. The CNN embedding model can include one or more LSTM layers, and may be a deep LSTM neural network architecture built by stacking multiple LSTM layers. The CNN embedding model may be trained using a loss function tuned for learning differentiation features. The different features can include triplet loss function, softmax loss function, or n-pairs loss function, to name a few examples.

Moreover, the ensemble model may be trained further based on tunable parameters that define desired model metrics and a resource budget. These tunable parameters may specify parameters such as a desired F1 score or accuracy for the trained ensemble model, may define a budget, or may specify a best fit mode. A tunable parameter may specify a budget of a particular number of iterations. The ensemble model training engine may then then train that particular number of machine learning models given the provided features, using various different algorithms and, once all of the algorithms are trained, the model having the best performance may be chosen as the ensemble model.

Using the ensemble model, a score for each of the multiple test cases is generated in connection with testing the updated version of the software application (210). Specifically, a test case prioritizer can use an algorithm that considers, for each test case, the prediction of the ensemble model the test case, the risk index value for the test case, and the priority assigned to the test case, to generate a risk score that is used to assign test cases to a category of "low risk," "medium risk," and "high risk" for risk-based testing.

Data is output that identifies one or more of the multiple test cases and, for each test case, the score in connection with testing the updated version of the software application (212), thereby ending the process 200 (214). This data may include, for example, a ranked list of test cases, that is provided for display in a user interface. The test cases may also be executed in their prioritized order on the second version of the software application.

In summary, through the use of process 200, test cases that are most likely to identify an important anomaly are identified for execution sooner than test cases that are unlikely to identify important anomalies, that are likely to not identify any anomalies at all, or that are likely to only identify anomalies that other test cases are also likely to identify. Computational resources are preserved through implementation of the process 200 by not executing unwanted or redundant or unnecessary test cases. The early detection of defects reduces uncertainties that can lead to product backlog. Prioritization of test cases on updated versions of software applications can be performed using information that is already generated in the testing of legacy versions of the same software application, or of different software applications, eliminating additional or stand-alone feature generation operations.

Figure 3:
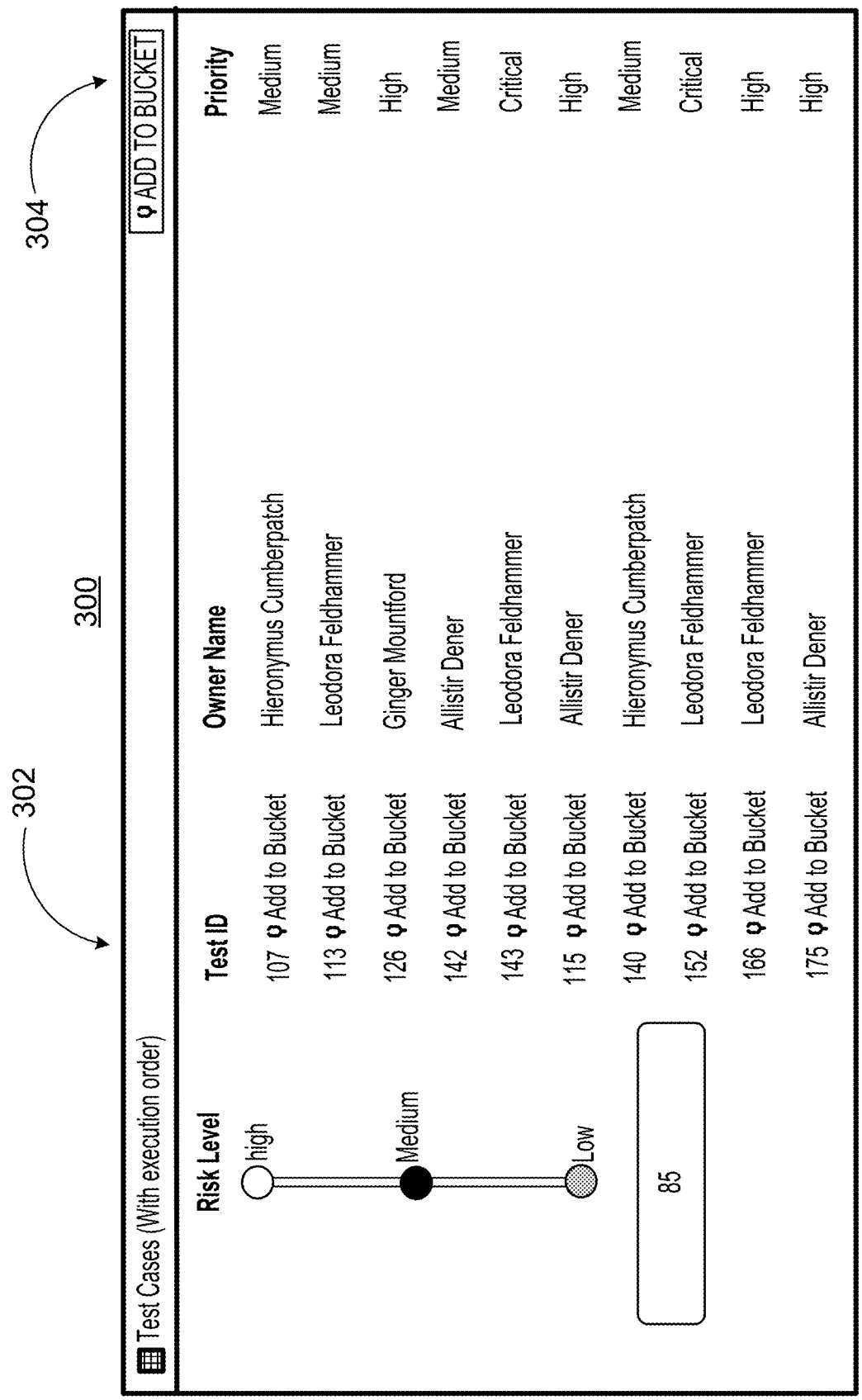
FIG. 3 illustrates a user interface that depicts prioritized test cases, according to one example implementation.

FIG. 3 illustrates a user interface 300 that depicts prioritized test cases, according to one example implementation. Specifically, user interface 300 ranks the test cases in a suggested execution order, deprecating those test cases that are identified by the enhanced techniques described by this specification as redundant or unnecessary. A first column 302 of the user interface 300 indicates a test identifier for each test case, and a second column 304 of the user interface indicates a priority that is assigned to each test case. Other information, such as an owner name that is associated with each case, or a risk level or score associated with each test case or with a suite of test case may also optionally be illustrated.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A computer-implemented method comprising:
   obtaining test artifacts that were generated as a result of testing one or more legacy versions of a software application using multiple test cases that were each executed multiple times;
   extracting features from the test artifacts for each of the test cases, the features including a number of times each test case was executed and passed when testing the legacy versions, and a number of times that each test case was executed and failed when testing the legacy versions;
   generating, for each of the test cases, a risk index value for the test case that reflects a risk that the test case was unnecessary or redundant when testing the legacy versions of software application, the risk index value being based at least on the extracted features;
   training an ensemble model to generate, for a given input test case, a risk index value that reflects whether the given test case is likely unnecessary or redundant in connection with testing an updated version of the software application, the ensemble model being trained based on training data that includes, for each test case, (i) description data for the test case, (ii) the risk index value for the test case that reflects the risk that the test case was unnecessary or redundant for testing the legacy versions of the software application, (iii) the number of times that the test case was executed and passed when testing the legacy versions, and (iv) the and a number of times that the test case was executed and failed when testing the legacy versions;
   for each test case of a candidate set of test cases, generating, using the trained ensemble model, a risk index value that reflects whether the test set of the candidate set is likely unnecessary or redundant in connection with testing the updated version of the software application; and
   executing one or more test cases of the candidate set in connection with testing the updated version of the software application in a priority order that is determined based on the risk index values that are generated for the candidate set.

2. The method of claim 1, wherein the training data comprises data indicating an execution status of each test case a first time that the test case was executed.

3. The method of claim 1, wherein the training data comprises data indicating a number of times each test case was executed.

4. The method of claim 1, wherein the training data comprises data indicating a priority that was assigned to each test case.

5. The method of claim 1, wherein the training data comprises data indicating a sequence number associated with each test case that failed.

6. The method of claim 1, wherein the description data for each test case is automatically generated based on an output of a natural language processing model.

7. The method of claim 1, wherein the ensemble model is trained using tunable parameters that define desired model metrics and a resource budget.

8. A non-transitory computer-readable storage medium storing one or more instructions that, when executed by one or more computers, perform operations comprising:
   obtaining test artifacts that were generated as a result of testing one or more legacy versions of a software application using multiple test cases that were each executed multiple times;
   extracting features from the test artifacts for each of the test cases, the features including a number of times each test case was executed and passed when testing the legacy versions, and a number of times that each test case was executed and failed when testing the legacy versions;
   generating, for each of the test cases, a risk index value for the test case that reflects a risk that the test case was unnecessary or redundant when testing the legacy versions of software application, the risk index value being based at least on the extracted features;
   training an ensemble model to generate, for a given input test case, a risk index value that reflects whether the given test case is likely unnecessary or redundant in connection with testing an updated version of the software application, the ensemble model being trained based on training data that includes, for each test case, (i) description data for the test case, (ii) the risk index value for the test case that reflects the risk that the test case was unnecessary or redundant for testing the legacy versions of the software application, (iii) the number of times that the test case was executed and passed when testing the legacy versions, and (iv) the number of times that the test case was executed and failed when testing the legacy versions;
   for each test case of a candidate set of test cases, generating, using the trained ensemble model, a risk index value that reflects whether the test set of the candidate set is likely unnecessary or redundant in connection with testing the updated version of the software application; and
   executing one or more test cases of the candidate set in connection with testing the updated version of the software application in a priority order that is determined based on the risk index values that are generated for the candidate set.

9. The medium of claim 8, wherein the training data comprises data indicating an execution status of each test case a first time that the test case was executed.

10. The medium of claim 8, wherein the training data comprises data indicating a number of times each test case was executed.

11. The medium of claim 8, wherein the training data comprises data indicating a priority that was assigned to each test case.

12. The medium of claim 8, wherein the training data comprises data indicating a sequence number associated with each test case that failed.

13. The medium of claim 8, wherein the description data for each test case is automatically generated based on an output of a natural language processing model.

14. The medium of claim 8, wherein the ensemble model is trained using tunable parameters that define desired model metrics and a resource budget.

15. A system comprising:
   one or more computers; and
   one or more computer memory devices interoperably coupled with the one or more computers storing one or more instructions that, when executed by the one or more computers, perform one or more operations comprising:
   obtaining test artifacts that were generated as a result of testing one or more legacy versions of a software application using multiple test cases that were each executed multiple times;
   extracting features from the test artifacts for each of the test cases, the features including a number of times each test case was executed and passed when testing the legacy versions, and a number of times that each test case was executed and failed when testing the legacy versions;

generating, for each of the test cases, a risk index value for the test case that reflects a risk that the test case was unnecessary or redundant when testing the legacy versions of software application, the risk index value being based at least on the extracted features;

training an ensemble model to generate, for a given input test case, a risk index value that reflects whether the given test case is likely unnecessary or redundant in connection with testing an updated version of the software application, the ensemble model being trained based on training data that includes, for each test case, (i) description data for the test case, (ii) the risk index value for the test case that reflects the risk that the test case was unnecessary or redundant for testing the legacy versions of the software application, (iii) the number of times that the test case was executed and passed when testing the legacy versions, and (iv) the number of times that the test case was executed and failed when testing the legacy versions;

for each test case of a candidate set of test cases, generating, using the trained ensemble model, a risk index value that reflects whether the test set of the candidate set is likely unnecessary or redundant in connection with testing the updated version of the software application; and executing one or more test cases of the candidate set in connection with testing the updated version of the software application in a priority order that is determined based on the risk index values that are generated for the candidate set.

16. The system of claim 15, wherein the training data comprises data indicating an execution status of each test case a first time that the test case was executed.

17. The system of claim 15, wherein the training data comprises data indicating a number of times each test case was executed.

18. The system of claim 15, wherein the training data comprises data indicating a priority that was assigned to each test case.

19. The system of claim 15, wherein the training data comprises data indicating a sequence number associated with each test case that failed.

20. The system of claim 15, wherein the description data for each test case is automatically generated based on an output of a natural language processing model.

* * * * *

UNITED STATES PATENT AND TRADEMARK OFFICE
CERTIFICATE OF CORRECTION

PATENT NO. : 11,989,119 B2
APPLICATION NO. : 17/679406
DATED : May 21, 2024
INVENTOR(S) : Sandeep Bhat, Rohit Shrikant Patwardhan and Rahul Ghanashyam Joglekar Page 1 of 1

It is certified that error appears in the above-identified patent and that said Letters Patent is hereby corrected as shown below:

In the Claims

In Column 13, Line 30, Claim 1, delete "and a".

Signed and Sealed this
First Day of April, 2025

Coke Morgan Stewart
*Acting Director of the United States Patent and Trademark Office*